United States Patent Office 2,993,848
Patented July 25, 1961

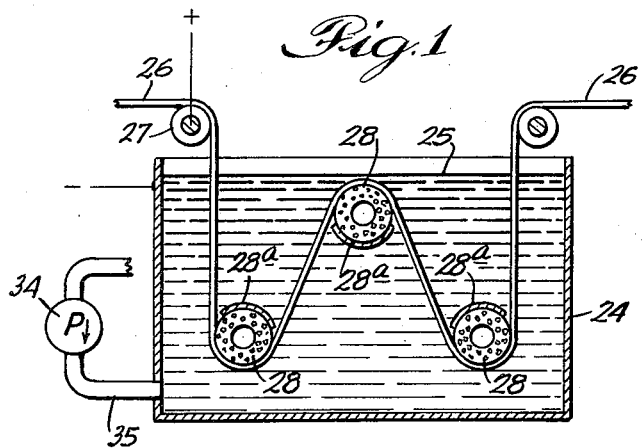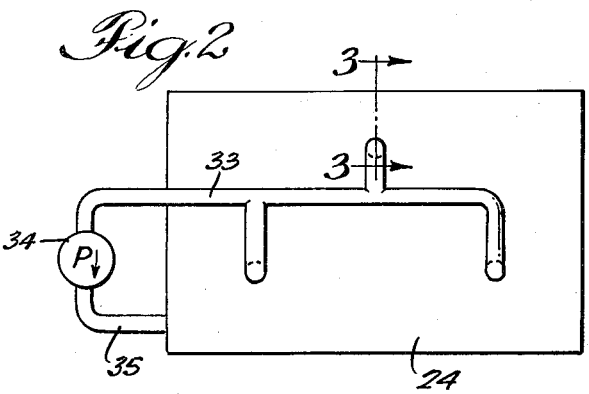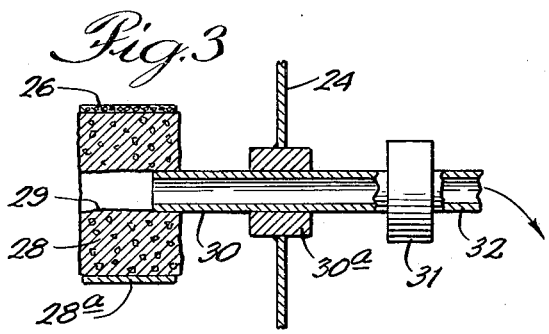

2,993,848
METHOD OF FORMING A DIELECTRIC OXIDE FILM ON A POROUS METAL STRIP
Joseph B. Brennan, deceased, late of Cleveland, Ohio, by Helen E. Brennan, executrix, 13018 Lake Shore Blvd., Cleveland, Ohio
Original application Nov. 4, 1952, Ser. No. 318,618, now Patent No. 2,868,702, dated Jan. 13, 1959. Divided and this application Oct. 13, 1958, Ser. No. 766,774
2 Claims. (Cl. 204—24)

This invention relates to a method of forming a dielectric oxide film on a porous metal strip and more particularly to the electrical oxidation of the interior and exterior exposed surfaces in a porous metal strip.

In the co-pending application of Joseph B. Brennan, Serial No. 318,618, filed November 4, 1952, now Patent No. 2,868,702, of which this application is a division, there is disclosed and claimed a method of forming a dielectric oxide film on metal strips according to which a strip which may be either porous or impervious is first thermally oxidized and thereafter electrolytically oxidized to form a relatively thick dielectric film thereon. The present invention relates to a method of electrically oxidizing porous metal strips rapidly and efficiently in a single step process to produce an effective dielectric oxide film on both the exterior and interior surfaces thereof.

It is therefore one of the objects of the invention to provide a method for uniformly producing a dielectric film on all of the exposed surfaces of a porous metal strip rapidly and with a high degree of efficiency.

Porous strips for treatment, according to the present invention, may be in the form of relatively flat, thick strips of wire or foil and may be made of any metal which readily oxidizes in an electrolyte, but which preferably are made of aluminum. The porous strips may be formed in any desired manner as, for example, by spraying as disclosed in Patent No. 2,547,371, either with or without the inclusion of porous paper.

In carrying out the process of the invention porous metal strips to be oxidized may have the dielectric film formed thereon by immersing the strip in an electrolyte bath comprising an equeous solution of borax and boric acid wherein the bath contains about .06% of borax and 8% of boric acid and the remainder pure water. Unidirectional electric current is caused to flow through such metal strips during oxidation and through the bath during such oxidation with the amperage being sufficient to form an oxide film on all exposed surfaces of the strip electrochemically. The positive pole of the source of current may be connected to the metal strip by placing conductive rolls in contact therewith. Preferably the temperature of the electrolyte is maintained at about 80 to 90° centigrade during the oxidizing operation.

According to the present invention, the electrolyte is continuously circulated through the strip from one surface to the other thereof while the strip is immersed in the electrolyte and is subjected to the flow of current. The constant flow of electrolyte insures that all of the surfaces of the strip or of the particles forming the strip both exterior and interior are constantly in contact with fresh enriched electrolyte. The electrolyte furnishes a source of oxygen for oxidation of the strip and by continuously circulating the electrolyte through the strip a high degree of uniformity in the oxide coating formed on the surfaces of the strip is attained.

As compared with prior processes in which a porous strip was simply passed through an electrolyte as, for example in Patent No. 2,547,371, it has been found that the present process speeds up formation of a dielectric film from two to three times. One reason is believed to be that circulation or flow of electrolyte through the strip continuously during the electrolytic oxidation removes hydrogen from the interior openings or interstices of the strip and insures that all surfaces thereof are constantly in contact with a liquid body of electrolyte providing ample available oxygen for oxidation of the material of the strip at all times.

One apparatus suitable for carrying out the process of the invention is illustrated in the accompanying drawing wherein FIGURE 1 is a vertical more or less diagrammatic section of an apparatus for carrying out the invention;

FIGURE 2 is a side elevation of the apparatus; and

FIGURE 3 is an enlarged partial section on the line 3—3 of FIGURE 2.

The apparatus, as disclosed, comprises a tank 24 adapted to contain a suitable electrolyte 25 which may comprise a solution of borax and boric acid in water. A porous strip 26 which is to have a dielectric oxide film formed thereon passes over guide rolls 27 into the electrolyte in the tank 24. A plurality of foraminous rolls 28 are rotatably mounted in the tank below the surface of the electrolyte and the strip 26 is led over these rolls and finally out of the tank.

The foraminous rolls 28, as best seen in FIGURE 3, are provided with center bores 29 therein with positioning sleeves or tubes extending slightly into the bores 29 and journalled in the walls of the tank 24 by suitable bearings 30a. The sleeves 30 connect the rotary couplings 31 from which conduits 32 extend. The conduits 32 connect to a return tube 33 which is in turn connected to the input side of a liquid pump 34. The discharge side of the pump 34 is connected back to the tank 24 through a conduit 35.

In operation, when the pump 34 is running it will draw electrolyte from the tank through the strip 26 at the points where it passes over the foraminous rolls 28 and into the bores 29 of the rolls. The liquid is then drawn through the tubes 32 and 33 into the pump and is forced through the conduit 35 back into the tank. Suitable masks 28a may be positioned over the surfaces of the rolls 28 which are not engaged by the strip 26 to minimize flow of electrolyte through these surfaces and to insure that the electrolyte will be drawn through the strip 26 from one surface to the other thereof. The masks 28a may be made of any impervious material which is inert in the electrolyte.

With the electrolyte being circulated through the porous strip from one surface to the other thereof while the strip and electrolyte are subjected to an electric oxidizing current flow, all of the surfaces of the strip including surfaces on the particles which make up the strip on the interior thereof, are rapidly and uniformly coated with an oxide film. It will be noted that the electric oxide current may be supplied in any desired manner as by connecting the guide roller 27 to one side of a current source and connecting the tank 24 to the other side of the source, as is conventional.

After the strip has passed through the tank and has had a dielectric oxide film formed on all of its surfaces, it may be formed into a condenser, as disclosed in Patent No. 2,547,371. If desired, the interstices of the strip could be filled with a suitable permanent electrode before forming it into a condenser, as described in Patent No. 2,304,073.

While one specific apparatus for carrying out the process has been disclosed, it will be understood that this is for the purpose of illustration only and is not to be taken as a definition of the scope of the present method, reference being had for this purpose to the appended claims.

What is claimed is:

1. In the electro formation of a dielectric oxide film on a porous metal strip, the steps of immersing a porous metal strip in a liquid oxidizing electrolyte, electrically oxidizing the strip while it is immersed in the electrolyte, and forcibly circulating a continuous flow of the electrolyte through the strip from one face to the other thereof uniformly throughout the width of the strip during the electrolytic oxidation.

2. In the electro formation of a dielectric oxide film on a porous metal strip, the steps of immersing a porous metal strip in a liquid oxidizing electrolyte, electrically oxidizing the strip while it is immersed in the electrolyte, passing the strip over a uniformly porous suction member while immersed in the electrolyte, and positively sucking a continuous flow of electrolyte through the strip and into the suction member during the electrolytic oxidation.

References Cited in the file of this patent

UNITED STATES PATENTS

| | | |
|---|---|---|
| 1,242,695 | Hood | Oct. 9, 1917 |
| 1,792,197 | Stresau | Feb. 10, 1931 |
| 2,226,381 | Norris | Dec. 24, 1940 |
| 2,042,030 | Tainton | May 26, 1936 |
| 2,304,073 | Brennan | Dec. 8, 1942 |
| 2,547,371 | Brennan | Aug. 3, 1951 |
| 2,567,877 | De Ment | Sept. 11, 1951 |